United States Patent [19]

Tajima

[11] Patent Number: 5,408,595
[45] Date of Patent: Apr. 18, 1995

[54] METHOD AND APPARATUS FOR COLORING OF RECOLORING OF VISUAL IMAGE

[75] Inventor: Joji Tajima, Tokyo, Japan

[73] Assignee: NEC Corporation, Tokyo, Japan

[21] Appl. No.: 118,280

[22] Filed: Sep. 9, 1993

Related U.S. Application Data

[63] Continuation of Ser. No. 432,841, Nov. 7, 1989, abandoned.

[30] Foreign Application Priority Data

Nov. 7, 1988 [JP] Japan .................................. 63-281930
Nov. 7, 1988 [JP] Japan .................................. 63-281932

[51] Int. Cl.$^6$ ............................................. G06F 15/62
[52] U.S. Cl. ..................................... 395/131; 395/132
[58] Field of Search ................... 395/126, 128–132; 345/150–155; 358/32, 37, 80, 161, 164

[56] References Cited

U.S. PATENT DOCUMENTS

| 4,843,599 | 6/1989 | Bucker | 340/701 X |
| 5,025,405 | 6/1991 | Swanson | 364/723 |
| 5,058,040 | 10/1991 | Tajima | 395/131 |

*Primary Examiner*—Almis Jankus
*Attorney, Agent, or Firm*—Foley & Lardner

[57] ABSTRACT

An image coloring/recoloring apparatus can provide natural-looking color images of an object illuminated by a source color. An input color image or a shaded image (grey scale image) which corresponds to the object is input to the coloring/recoloring apparatus. The coloring/recoloring apparatus logarithmically transforms a pixel sub-region corresponding to all or a portion of the object into intermediate color density data, which lies on a straight line in a color density space. This straight line starts at a point in the color density space corresponding to the source color and has a direction corresponding to the object's absorptive properties. By inputting a desired color and/or a new source color, it is possible to create a new image, which shows the object with the sub-region painted the desired color while being illuminated by the new source color.

4 Claims, 4 Drawing Sheets

FIG. 1
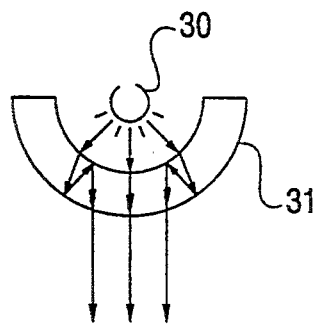
FIG. 2
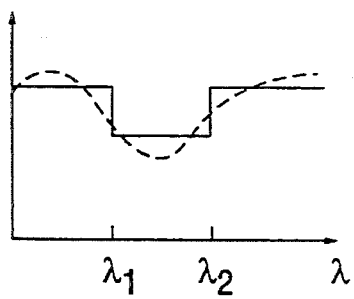
FIG. 3
FIG. 4
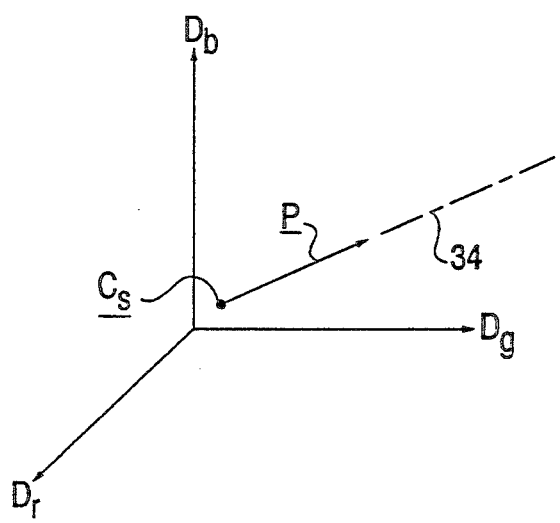

METHOD AND APPARATUS FOR COLORING OF RECOLORING OF VISUAL IMAGE

This application is a continuation of application Ser. No. 07/432,841, filed Nov. 7, 1989, now abandoned.

BACKGROUND OF THE INVENTION

The present invention relates to a method and an apparatus for coloring or recoloring a desired domain in a visual image without impairing the naturalness of shades.

Computer-aided design (CAD) has been introduced into the field of color design, and is now desirable to apply it to the coloring and recoloring of visual images. More specifically, a visual image including the object of design (an automobile, for instance) is inputted into a computer system through a scanner or a color camera. After reproducing it on a color display, the object domain is colored if it was previously uncolored or, is recolored, if it was already colored (for example, to recolor the red body of the automobile into blue). It is not simple to change the color in a natural-looking way because the color of the object, even though it is evenly colored, is shaded by the reflection and/or transmission of light. However, the following technique has already been proposed in the U.S. patent application Ser. No. 07/173,164 filed Mar. 25, 1988 by the same inventor as that of the present invention, as will now be described. Light beams coming from a source and reflected by an object to enter into a camera can be broadly classified into a mirror reflection beam and a diffuse reflection beam. The former, reflected off the surface of the object, changes only in intensity, while its spectral composition remains the same as the source. The latter results from the absorption of the light from the source into the object and its isotropic external emission. The spectral composition of the diffuse reflection beam usually differs from that of the source beam. Accordingly, the three components (R (Red), G (Green), B (Blue)) of each point on the object face can be represented by:

$$\begin{pmatrix} R \\ G \\ B \end{pmatrix} = \begin{pmatrix} R_o \\ G_o \\ B_o \end{pmatrix} \alpha + \begin{pmatrix} R_s \\ G_s \\ B_s \end{pmatrix} \beta \quad (1)$$

where $(R_o, G_o, B_o)$ are the three components of the diffuse reflection beam, which vary from object to object and, therefore, will be called the "object color"; $(R_s, G_s, B_s)$ are those of the mirror reflection beam, which are respectively equal to those of the light at its source and, therefore, will be here after called the "source color"; $\alpha$ and $\beta$ are matrices, which represent the contributions of the diffuse reflection beam and the mirror reflection beam, respectively, to the luminous energy emitted, and are affected by the material and orientation of the reflecting surface. Since they differ from pixel to pixel, the three components of a given pixel whose position in the image is (x, y), can be represented by:

$$\begin{pmatrix} R_{(x,y)} \\ G_{(x,y)} \\ B_{(x,y)} \end{pmatrix} = \begin{pmatrix} R_o \\ G_o \\ B_o \end{pmatrix} \alpha(x, y) + \begin{pmatrix} R_s \\ G_s \\ B_s \end{pmatrix} \beta(x, y) \quad (2)$$

If the source colors and the object colors are known, $\alpha(x, y)$ and $\beta(x, y)$ can be calculated from $(R_{(x,y)}, G_{(x,y)}, B_{(x,y)})$.

To figure out how an object of the same material in a different color will look, the pixel values are calculated by Equation (3) in which only the color of the object is altered to $(R_o', G_o', B_o')$.

$$\begin{pmatrix} R'_{(x,y)} \\ G'_{(x,y)} \\ B'_{(x,y)} \end{pmatrix} = \begin{pmatrix} R_o' \\ G_o' \\ B_o' \end{pmatrix} \alpha(x, y) + \begin{pmatrix} R_s \\ G_s \\ B_s \end{pmatrix} \beta(x, y) \quad (3)$$

This model, however, presupposes that the object color and the source color are independent of each other in the RGB space. As a consequence, if an originally uncolored (i.e., achromatic) region is to be colored, $\alpha(x, y)$ and $\beta(x, y)$ cannot be figured out because the directions of the object color and the source color are parallel in the chromatic space. Hence, uncolored object cannot be colored by this conventional manner.

Moreover, since this is a physical model constructed for use with an object made of plastic or the like, its application to a color transmitted by a transparent object or one reflected by cloth or the like, even if the image is similarly shaded, may not necessarily provide a natural-looking image.

SUMMARY OF THE INVENTION

An object of the present invention is, therefore, to provide a method and an apparatus to enable uncolored regions to be colored in a natural-looking manner.

Another object of the invention is to provide a recoloring method and apparatus, which enables the object color to be altered in a natural-looking manner even where Equation (1) does not hold.

A visual image coloring or recoloring method according to the invention is based on the assumption that the three primary color values of pixels in a given colored region on an object contained in a color image, logarithmically transformed, lie on a first straight line in the direction of a first absorption vector passing a first source color in a three-dimensional chromatic space. The method includes the steps of: transforming the density of each pixel in an uncolored shaded region of the original visual image into intermediate coordinate values on the first straight line; giving either a desired color for the object or a second source color together with the desired color for the object; setting a second straight line in the direction of a second absorption vector passing the first source color or the second source color and calculating the altered three primary color values of the pixels from said intermediate coordinate values to thereby alter the color of said uncolored region to the desired color.

A visual image coloring or recoloring apparatus using this method according to the invention comprises: color image memory means for storing a color image having an uncolored region, source color memory means for storing the source color of said color image;

intermediate image calculating means for logarithmically transforming the densities of the pixels in the uncolored region in said color image and transforming the color of each pixel into an intermediate coordinate value; intermediate image memory means for storing said intermediate coordinate value of each pixel; absorption vector calculating means for calculating an absorption vector from a newly given color desired for the object; and altered image calculating means for calculating the altered three primary color values for each pixel either from said absorption vector and said source color or from the newly given source color and said intermediate coordinate values, whereby the apparatus gives the desired color to the object uncolored region in the image.

Another visual image recoloring method according to the invention, is also based on the assumption that the three primary color values of pixels in a given colored region, when logarithmically transformed, lie on a first straight line in the direction of a first absorption vector passing a first source color in a three-dimensional chromatic space. The method includes the steps of: transforming the values of said three primary colors into intermediate coordinate values on the first straight line; giving either a desired color for the object or a second source color and the desired color for the object; setting a second straight line in the direction of a second absorption vector passing the first source color or the second source color; and calculating the altered three primary color values of the pixels from the intermediate coordinate values to thereby alter the color of said colored region to the desired color.

A visual image recoloring apparatus using this method comprises: color image memory means for storing a color image; source color memory means for storing the source color of said color image; color distribution calculating means for figuring out the distributing direction in a three-dimensional chromatic space by logarithmically transforming the primary color values of pixels in said color image; absorption vector calculating means for calculating an absorption vector from said distributing direction and the color of said color image; intermediate image calculating means for transforming the color of each pixel into an intermediate coordinate value by using said source color and said absorption vector; intermediate image memory means for storing said intermediate coordinate value of each pixel; and altered image calculating means for calculating the altered three primary color values for each pixel either from a second absorption vector set on the basis of a newly given color for the color image and said source color or from the newly given source color and said intermediate coordinate values, whereby the apparatus alters the color of the object colored region in the color image to the desired color.

BRIEF DESCRIPTION OF THE DRAWINGS

FIG. 1 is an illustrative diagram for use in describing the effect of the present invention with respect to a transparent body;

FIG. 2, an illustrative diagram for use in describing the effect of the present invention with respect to a reflective body;.

FIG. 3, a diagram illustrating a sectionally constant spectral characteristic which the effect of the invention presupposes;

FIG. 4, a diagram illustrating a color distribution which the invention presupposes;

DETAILED DESCRIPTION OF THE INVENTION

Figure 5:
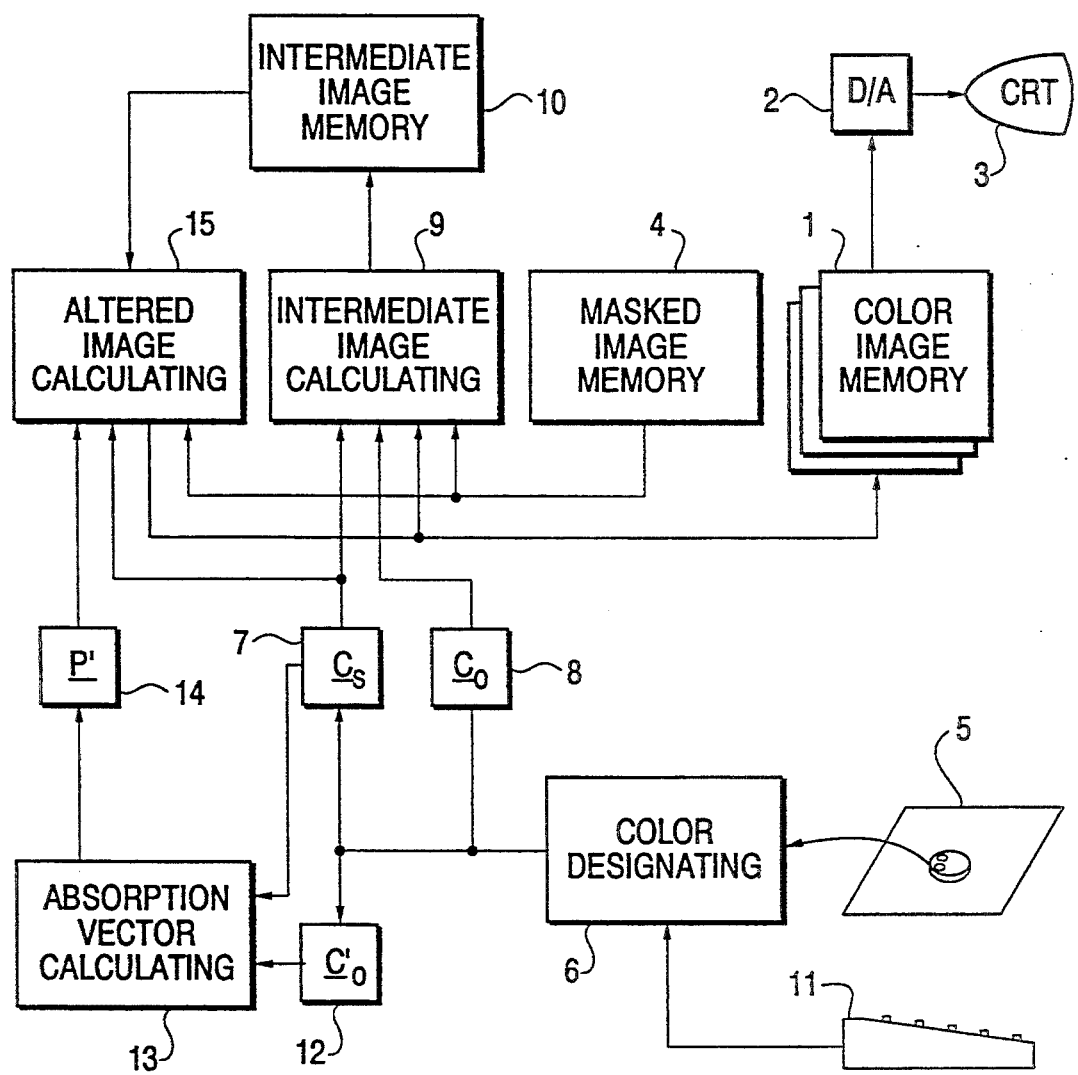
FIG. 5, a block diagram illustrating a first embodiment of the invention.

The effect of the present invention will be described below with reference to FIGS. 1 and 2. For instance, the hatches of light passing a lampshade made of colored glass can be considered to be generated, with reference to FIG. 1, by the repeated reflection of the light from a bulb 30 within a body of colored glass 31. The shades of the color of deep-pile cloth, such as a carpet, presumably result, as in FIG. 2, from the repeated reflection of light from a source 32 by pile pieces 33 before it reaches the eyes. In these two cases, the reflected color can be approximated by modeling the extent of the absorption of energy from a light source by a medium having a certain absorptive characteristic.

Representing the spectral energy distribution of light from a source by $S(\lambda)$ and the transmittance through a unit length of the object matter, or the reflectance after a unit number of repetitions by $\rho(\lambda)$, the spectral energy distribution $S'(\lambda)$ of the light having been subjected to the absorptive effect of transmission or reflection is represented by Equation (4) below:

$$S'(\lambda) = S(\lambda)\rho l(\lambda) \tag{4}$$

where l is the length of the section of the optical path passing the medium in the case of transmission, or the relative number of reflections in the case of reflection.

The source color represented by $(R_s, G_s, B_s)$ before transmission or reflection has the relationship of:

$$R_s = \int S(\lambda) r(\lambda) d\lambda \tag{5}$$
$$G_s = \int S(\lambda) g(\lambda) d\lambda$$
$$B_s = \int S(\lambda) b(\lambda) d\lambda$$

where $\bar{r}(\lambda)$, $\bar{g}(\lambda)$ and $\bar{b}(\lambda)$ are the sensitivities of sensors respectively corresponding to red, green and blue. The color after transmission or reflection, represented by $(R, G, B)$, has the relationship of:

$$R_s = \int S'(\lambda) r(\lambda) d\lambda = \int S(\lambda) \rho l(\lambda) r(\lambda) d\lambda \tag{6}$$
$$G_s = \int S'(\lambda) g(\lambda) d\lambda = \int S(\lambda) \rho l(\lambda) g(\lambda) d\lambda$$
$$B_s = \int S'(\lambda) b(\lambda) d\lambda = \int S(\lambda) \rho l(\lambda) b(\lambda) d\lambda$$

In the forms of Equations (5) and (6), $(R, G, B)$ cannot be figured out from the relationship between the source color and the optical path length or the number of repeated reflections unless the spectral characteristic $\rho(\lambda)$ of the medium is known.

If it is supposed, however, that every spectral characteristic smoothly varies with respect to the wavelength, the spectral characteristic to be identified can be approximated by one that is sectionally constant, such as shown in FIG. 3. Thus, the intensity of the light light is at the source is approximated as $R_s$ at $\lambda > \lambda_2$, $G_s$ at $\lambda_1 < \lambda_2$ or $B_s$ at $\lambda < \lambda_1$, and the transmittance or reflectance of the object is approximated as $\rho_r$ at $\lambda > \lambda_2$, $\rho_g$ at $\lambda_1 < \lambda < \lambda_2$ or $\rho_b$ at $\lambda < \lambda_1$. In this case the color of the object, relative to l, can be figured out from:

$$R = \rho_r^l \cdot R_s, \quad G = \rho_g^l \cdot G_s, \quad B = \rho_b^l \cdot B_s \tag{7}$$

Taking the logarithms of these equations for representation in the form of density will give:

$$D_r \equiv -\log R = -l \cdot \log \rho_r - \log R_s \equiv l \cdot P_r + D_{rs} \tag{8}$$

$$D_g \equiv -\log G = -l \cdot \log \rho_g - \log G_s \equiv l \cdot P_g + D_{gs}$$

$$D_b \equiv -\log B = -l \cdot \log \rho_b - \log B_s \equiv l \cdot P_b + D_{bs}$$

If, for instance, the values of R, G and B are between 0 and 255, these equations will become:

$$D_r \equiv -\log(R/255) = -l \cdot \log \rho_r - \log(R_s/255) \equiv l \cdot P_r + D_{rs} \tag{8}$$

$$D_g \equiv -\log(G/255) = -l \cdot \log \rho_g - \log(G_s/255) \equiv l \cdot P_g + D_{gs}$$

$$D_b \equiv -\log(B/255) = -l \cdot \log \rho_b - \log(B_s/255) \equiv l \cdot P_b + D_{bs}$$

Here, $$P_i \equiv -\log \rho_i, \quad D_{is} \equiv -\log(I_s/255) \quad (i = r, g, b; \; I = R, G, B)$$

so that variations in color with changes in l will take place on a straight line 34 passing a source color density vector $\underline{C}_s \equiv (D_{rs}, D_{gs}, D_{bs})$ in a $(D_r, D_g, D_b)$ density space as shown in FIG. 4. The color density vector $\underline{C}(x,y) \equiv (D_r(x,y), D_g(x,y), D_b(x,y))$ of each point in a given chromatic region can be represented by:

$$C(x,y) = l(x,y)P + C_s \tag{9}$$

where the absorption vector $\underline{P}$ is defined to be $\underline{P} \equiv (P_r, P_g, P_b)$.

Now, in an uncolored region, the following relationships hold with respect to the source color density vector $\underline{C}_s$ and the absorption vector $\underline{P}$:

$$D_{rs} = D_{gs} = D_{bs} \quad P_r = P_g = P_b \tag{10}$$

Therefore, the density can be considered with respect to any one of the three primary color components for each pixel value.

On the basis of the foregoing theory, an uncolored region can be colored in the following manner.
(1) Determine the source color. Represent the density value $D_i$ ($i = r, g, b$) of the brightest part in the region by $D_{is}$, for instance.
(2) Designate an appropriate point (here l is assumed to be 1), and regard the density $D_i$ of its brightness as the reference density $D_{io}$.
(3) Give a color so as to alter the part of the reference density to a new reference level $(R_o', G_o', B_o')$. The density vector of this color is represented by $C_o' \equiv (D'_{ro}, D'_{go}, D'_{bo})$. Then, as the reference density $D_{io}$ is first obtained from l=1, the absorption vector:

$$P_i = D_{io} - D_{is} \; (i = r, g, b) \tag{11}$$

can be obtained from Equation (9). Similarly, with respect to each point in the uncolored region, the absorption quantity l(x, y) can be calculated from its density $D_i(x, y)$ by the following equation, $$l(x, y) = \frac{D_i(x, y) - D_{is}}{D_{io} - D_{is}}. \tag{12}$$

Further, since the point of l=1 is altered to $C_o'$, the absorption vector $\underline{P}' \equiv (P_r', P_g', P_b')$ for the new color can be obtained from $$P' = C_o' - C_s \tag{13}$$

As the l(x, y) for each pixel is already determined, the color of the colored pixels can be calculated by Equation (14) in the same way as Equation (9), $$C'(x,y) = l(x,y) P' + C_s \tag{14}$$

In, the case of recoloring an already colored region the color distribution spreads from a linear line because of the presence of noise contents in the visual image. However, the direction of the absorption vector $\underline{P}$ can be calculated from the pattern of color distribution in the density space of a given chromatic region, according to the directional vector $\underline{v}$ of a first main axis. The directional vector $\underline{v}$ is obtained as follows, The covariance matrix $\Sigma$ of the density distribution of points in a density space in a given chromatic region takes the following symmetric form.

$$\Sigma = \frac{1}{N} A \tag{15}$$

wherein the components $A_{ij}$ of the matrix A are:

$$A_{11} = \Sigma (D_r(x, y) - D_r)^2$$

$$A_{12} = \Sigma (D_g(x, y) - D_g)(D_r(x, y) - D_r)$$

$$A_{13} = \Sigma (D_r(x, y) - D_r)(D_b(x, y) - D_b)$$

$$A_{21} = A_{12}$$

$$A_{22} = \Sigma (D_g(x, y) - D_g)^2$$

$$A_{23} = \Sigma (D_g(x, y) - D_g)(D_b(x, y) - D_b)$$

$$A_{31} = A_{13}$$

$$A_{32} = A_{23}$$

$$A_{33} = \Sigma (D_b(x, y) - D_b)^2$$

These can be diagonalized by using an orthogonal matrix $\underline{O}$ and can be rewritten into:

$$O^{-1} \Sigma O = \begin{pmatrix} \delta_1^2 & 0 & 0 \\ 0 & \delta_2^2 & 0 \\ 0 & 0 & \delta_3^2 \end{pmatrix} \delta_1^2 \geq \delta_2^2 \geq \delta_3^2 \tag{16}$$

The proper vectors $(v_1, v_2, v_3)$ constitute $\underline{O}$. The proper $v_1$, which corresponds to the greatest proper value $\delta_1^2$, is considered the directional vector $\underline{v}$ of the first main axis.

On the basis of the foregoing theory, a given chromatic region is recolored in the following manner.
(1) Determine the source color $(R_s, G_s, B_s)$, from which the density vector $C_s$ of the source color is obtained.

(2) Designate a point (l is assumed to be 1 here), represent its color by ($R_o$, $G_o$, $B_o$) (hereinafter called the reference color) and calculate the reference color density ($D_{ro}$, $D_{go}$, $D_{bo}$) in the same way as Equation (8).

(3) Give a color so as to alter the reference color to a desired new reference color ($R_o'$, $G_o'$, $B_o'$).

Then, representing the density vector of the reference color $D'_{ro}$, $D'_{go}$, $D'_{bo}$) at l=1 by $C_{o2}$ and $D'$ projecting onto the nearest point on the straight line of Equation (9), the absorption vector $\underline{P}$ is obtained i.e., $$P = \{(C_o - C_s) \cdot v\}v, \quad (17)$$

where $\{.\}$ represents the inner product of the vector. Similarly, l(x, y) for every point in a given chromatic region can be obtained from its color density vector $\underline{C}(x, y)$.

$$l(x, y) = \frac{\{C(x, y) - C_s\} \cdot P\}}{\{P \cdot P\}}. \quad (18)$$

Further as the point of l=1 is altered to ($R_o'$, $G_o'$, $B_o'$) with the new reference color being represented by $C_o' \equiv (D_{ro}', D_{go}', D_{bo}')$ the absorption vector $\underline{P}' \equiv (P_r', P_g', P_b')$ for the new color can be calculated by Equation (13), and the color of the pixels in the new color, by Equation (14).

Figure 6B:
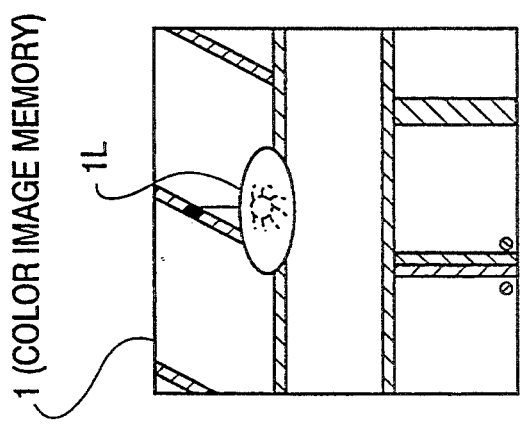
FIG. 6a and 6b illustrate its corresponding color image memory and a masked image memory, respectively as used in the first embodiment of the invention.
Figure 6A:
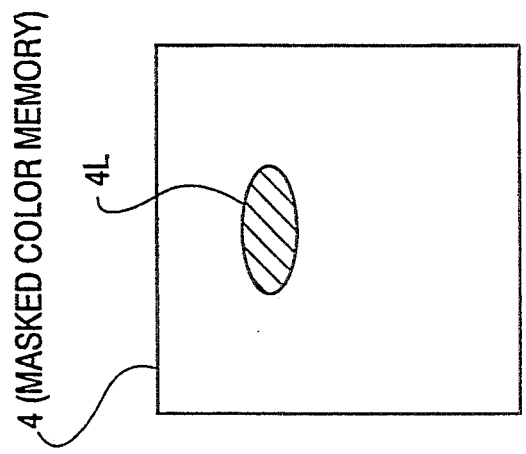

Now will be described a first preferred embodiment of the present invention with reference to FIG. 5. A color image memory 1 stores a full color image, including an uncolored object to be colored, in a tone scale of eight bits each for R, G and B. This content is displayed as a color image on a CRT 3 via a digital-to-analog (D/A) converter 2. A masked image memory 4 stores the mask of the region to be colored in the image at a rate of one bit per pixel. For instance, referring to FIG. 6(b), the color image memory 1 stores a scene inside a room including a lamp 1L with an uncolored transparent glass shade. The masked image memory 1 has a masked image 4L in which only the glass shade part, which is to be colored, has the value of "1" and all the rest has the value of "0", as shown in FIG. 6(a). The masked image 4L is supposed to have already been prepared by a technique well known to those skilled in the art. For instance, by drawing the contour with a pointing device 5 and shading the part surrounded by the contour while observing the color image on the CRT 3.

To color the object region, the user picks out the parts of a source color and of a reference color from said color image with the pointing device 5, for instance, and color designating section 6 transforms these pieces of information into a source density $D_{is}$ and a reference density $D_{io}$, which are stored in source color memory 7 and reference color memory 8, respectively.

Intermediate image calculating section 9 scans the pixels in the masked image memory 4, and figures out the density $D_i(x, y)$ of each pixel having the value of "1" from the pixel values stored in the color image memory 1. Then, the calculating section 9 calculates l(x, y) in accordance with Equation (12) and writes the result into an intermediate image memory 10 as image data. Upon completion of an intermediate image, the preparations are all set for coloring.

In an actual coloring process, first the user picks out a color in the image with the pointing device 5 or gives the three primary color values ($R_o'$, $G_o'$, $B_o'$) of the reference color to the color designating section 6 through a keyboard 11. Then, the reference color density vector $\underline{C_o}'$ is stored into reference color memory 12. Further, absorption vector calculating section 13 calculates the absorption vector $\underline{P}'$ from this density vector by Equation (13), and stores it into absorption vector memory 14. Altered image calculating section 15 scans the pixels in the masked image memory 4 so as to figure out, for pixels whose values are "1", $\underline{C}'$ (x y) by Equation (14) from l(x, y) available from the intermediate image memory 10, $\underline{P}'$ available from the absorption vector memory 14 and $C_s$ available from the source color memory 7. Then, the calculating section 15 retransforms the density values thereby obtained into three primary color values, and writes the pixel value (R'(x, y), G'(x, y), B'(x, y)) into the color image memory 1 again. The equations of transformation from density values into three primary color values are Equations (19) below, which are reverse to Equations (8).

$$R = 255 \cdot 10^{-D_r}, G = 255 \cdot 10^{-D_g}, B = 255 \cdot 10^{-D_b} \quad (19)$$

Upon completion of the foregoing for every pixel, the color of the pixels having the value of "1" in the mask image within the image stored in the color image memory 1 will have been replaced with the desired color with natural shades.

The foregoing referred to a case in which the uncolored part of the object was to be colored without altering the source color. However, if the source is to be altered in color or given a new color, recoloring can also be achieved by designating a new source color $C_s$ with the color designating section 6 and the pointing device 5 or the keyboard 11, then rewriting the content of the source color memory 7 and finally executing Equation (14) with the altered image calculating section 15 in the same manner as described above.

By using the method and apparatus described above, an uncolored region, which should be essentially uniform in color but have shades differing with the degree of transmission or reflection, can be given a designated color without looking unnatural. The present invention is most suitable for objects whose shades of color are varied by continual absorption.

Figure 7:
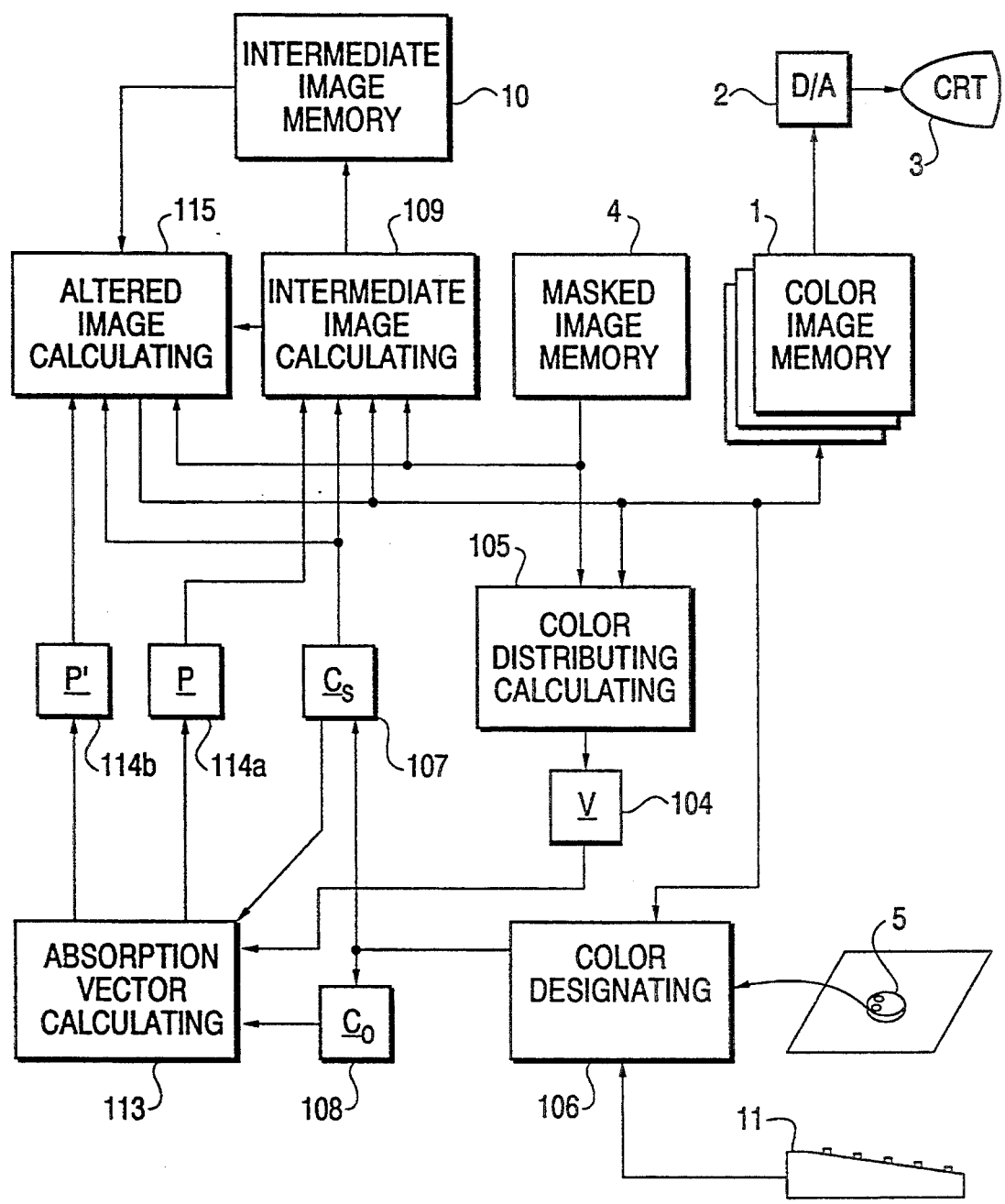
FIG. 7, a block diagram of a second embodiment of the invention.

Next will be described a second embodiment of the invention. Referring to FIG. 7, color distribution calculating section 105 scans the pixels in the masked image memory 4 and the color image memory 1. The color distribution calculating section 105 first calculates, densities ($D_r$, $D_g$, $D_b$) from (R, G, B) stored in the color image memory 1 for pixels having the value of "1" in the masked image memory 4, and then prepares a covariance matrix of color distribution in accordance with Equation (15). Then, the proper vectors are obtained by diagonalizing the matrix, the directional vector of the first main axis being represented by $\underline{v}$. The color distribution calculating section 105 achieves the foregoing calculations with a programmed microcomputer or the like. The vector $\underline{v}$ thereby obtained is stored into main axis vector memory 104.

Color designating section 106, as instructed by the user, picks out a source color and a reference color from an image by using the CRT 3 and the pointing device 5. The color designating section 106 then transforms the source color and reference color into densities, and stores the source color density vector $C_s$ into source color memory 107 and the reference color density vector $C_o$ into reference color memory 108. Absorption vector calculating section 113, with reference to the main axis vector $\underline{v}$, transforms $C_o$ into the absorption vector $\underline{P}$ in accordance with Equation (17) and stores it into first absorption vector memory 114a. The absorption vector calculating section 113 can be realized with a microcomputer or the like.

Intermediate image calculating section 109 scans the pixels in the masked image memory 4. The image calculating section 109 first figures out, for pixels having the value of "1" in it, the density vector $\underline{C}(x, y)$ from pixel values (R(x, y), G(x, y), B(x, y)) stored in the color image memory 1, calculates l(x, y) in accordance with Equation (18), and writes the result into the intermediate image memory 10 as image data. Thus, upon completion of an intermediate image, the preparations are all set for recoloring.

In an actual coloring process, first the user gives the RGB values ($R_o'$, $G_o'$, $B_o'$) of a new reference color to replace the current reference color of ($R_o$, $G_o$, $B_o$) by, for instance, using the pointing device 5 or through the keyboard 11 to the color designating section 106. The density vector $\underline{C}_o'$ of the new reference color is stored into reference color memory 108. Further, the absorption vector calculating section 113 calculates a second absorption vector $\underline{P}'$ from this density vector by Equation (13), and stores it into a second absorption vector memory 114b. Altered image calculating section 115 scans the pixels in the masked image memory 4. The calculating means 115 figures out, again for pixels whose values are "1", $\underline{C}'(x, y)$ by Equation (14) from l(x, y) available from the intermediate image memory 10, P' available from the second absorption vector memory 114b and $C_s$ available from the source color memory 107. The calculating section 115 writes the pixel value (R'(x, y), G(x, y), B'(x, y)), resulting from the retransformation of the density values thereby obtained into three primary color values, into the color image memory 1 again. Upon completion of the foregoing for every pixel, the color of the pixels having the value of "1" in the mask image within the image stored in the color image memory 1 is replaced with the desired color with no unnatural shades.

The foregoing referred to a case in which the color of the object was to be altered without changing the source color. However, if the source color is to be altered, too, this can be achieved as readily by designating a new source color $\underline{C}_s$ with the color designating section 106 and the pointing device 5 or the keyboard 11, rewriting the content of the source color memory 107 and then executing Equation (14) with the altered image calculating section 115 in the same manner as described above.

By using the method and apparatus described above, the color of a region, which should be essentially uniform in color but have shades differing with the degree of transmission or reflection, contained in a color image can be altered to a designated color without looking unnatural. As the present invention enables the color of a design to be changed and displayed in a natural looking manner without altering the surrounding situation in the image, it affords the significant industrial and economic advantage of making it possible to check color coordination without having to actually make a product in the contemplated color.

What is claimed is:

1. A method of displaying a realistic color image of an achromatic object in a color visual image to be displayed, said method comprising the steps of:

receiving visual image signals representing said visual image;

storing said visual image signals in a color image memory;

designating a region of said visual image as an achromatic region, said achromatic region defining said achromatic object;

generating a mask to indicate a position of said achromatic region in said visual image;

selecting a first point of said visual image other than a point in said achromatic region to obtain a source color density $D_s$ of a source color $C_s$;

storing said source color density $D_s$ in a source color memory;

selecting a second point, different from said first point, of said visual image other than a point in said achromatic region to obtain a first reference density $D_o$ of a first reference color $C_o$;

storing said first reference density $D_o$ in a first reference color memory;

calculating an object density $D_f(x,y)$ of each point in said achromatic region indicated by said mask;

calculating an absorption quantity l(x,y) by means of intermediate image calculating means using said source density and said reference density, stored in said source color memory and said first reference color memory, respectively, and said object density by the following equation:

$$l(x, y) = \frac{D_f(x, y) - D_s}{D_o - D_s}$$

storing said absorption quantity l(x,y) in an intermediate image memory;

designating a second reference color $C_o'$ and storing said second reference color in a second reference color memory;

calculating an absorption vector P' by means of absorption vector calculating means using said source color and said second reference color, stored in said source color memory and said second reference color memory, respectively, by the following equation:

$$P^1 = C_o^1 - C_s$$

storing said absorption vector in an absorption vector memory;

calculating an altered image color C'(x,y) by means of altered image calculating means using said absorption quantity, said absorption vector and said source color, stored in said intermediate image memory, said absorption vector memory and source color memory, respectively, by the following equation:

$$C^1(x, y) = l(x, y)P^1 + C_s$$

storing said altered image color C'(x,y) in said color image memory at a position representing said achromatic region; and displaying an image stored in said color image memory on a display device such that said achromatic object is realistically displayed as said realistic color image.

2. An apparatus for displaying a realistic colored image of an achromatic object in a color visual image to be displayed on a display comprising:

means for receiving visual image signals representing said visual image;

a color image memory, said visual image signals being stored in said color image memory;

means for designating a region of said visual image as an achromatic region, said achromatic region defining said achromatic object;

a mask indicating a position of said achromatic region in said visual image;

a pointer selecting a first data point in said visual image other than a data point of said achromatic region;

means for generating a source color density $D_s$ of a source color $C_s$ using said first data point;

a source color memory storing said source color density $D_s$;

said pointer selecting a second data point different from said first data point, in said visual image other than a data point of said achromatic region, to obtain a first reference density $D_o$ of a first reference color $C_o$;

a first reference color memory storing said first reference density $D_o$;

calculating means for calculating an object density $D_i(x, y)$ of each point in said achromatic region indicated by said mask;

intermediate image calculating means coupled to receive said source density and said reference density, stored in said source color memory and said first reference color memory, respectively, and said object density for calculating an absorption quantity $l(x, y)$ by the following equation:

$$l(x, y) = \frac{D_i(x, y) - D_s}{D_o - D_s}$$

an intermediate image memory coupled to said intermediate image calculating means, said intermediate image memory storing said absorption quantity $l(x,y)$;

designating means for designating a second reference color $C_o'$ and storing said second reference color to a second reference color memory;

absorption vector calculating means coupled to receive said source color and said second reference color, stored in said source color memory and said second reference color memory, respectively, for calculating an absorption vector $P'$ by the following equation:

$$P^l = C_o^l - C_s$$

absorption vector memory coupled to said vector calculating means, said absorption vector memory storing said absorption vector;

altered image calculating means for calculating an altered image color $C'(x,y)$ by the following equation:

$$C^l(x, y) = l(x, y)P^l + C_s$$

means for storing said altered image color $C'(x,y)$ in memory locations in said color image memory at a position of said achromatic region; and means for providing data stored in said color image memory to said display so as to display said visual image including said realistic colored image.

3. A method for changing a first displayed color of a given colored region in an overall visual image to be displayed on a display to a second displayed color so as to display said given colored region in said second color, said method comprising the steps of:

receiving visual image signals representing said overall visual image;

storing data of said overall visual image in a color image memory;

selecting a colored region portion of said data of said overall visual image to define said given colored region;

generating a mask indicating a position of said given colored region in said visual image;

calculating an object density vector $C_i(x,y)$ of each point in said given colored region indicated by said mask;

calculating a directional vector v of a main axis by means of color distribution calculating means by preparing a covariance matrix based on said object density vector $C_i(x,y)$ and by diagonalizing said covariance matrix;

storing said directional vector in a main axis vector memory;

selecting a first point in said visual image other than a point in said given colored region to obtain a source color density vector $C_s$;

storing said source color density vector in a source color memory;

selecting a second point, different from said first point, in said visual image other than a point in said given colored region to obtain a first reference density vector $C_o$;

storing said first reference density vector in a first reference color memory;

calculating a first absorption vector P by means of absorption vector calculating means using said source color density vector, said first reference density vector and said directional vector, stored in said source color memory, first reference color memory and said main axis vector memory, respectively, by the following equation:

$$P = ((C_o - C_s) \cdot v)v$$

storing said first absorption vector P in a first absorption vector memory;

calculating an absorption quantity $l(x,y)$ by means of intermediate image calculating means using said source color density vector and said first absorption vector, stored in said source color memory and said first absorption vector memory, and said object density vector by the following equation:

$$l(x, y) = \frac{((C_i(x, y) - C_s) \cdot P)}{(P \cdot P)}$$

storing said absorption quantity $l(x,y)$ in an intermediate image memory;

designating a second reference density vector $C_o'$ and storing said second reference density vector in a second reference color memory;

calculating a second absorption vector P' by means of said absorption vector calculating means using said source color density vector and said second reference density vector, stored in said source color memory and said second reference color memory, respectively, by the following equation:

$$P^1 = C_o^1 - C_s$$

storing said second absorption vector in a second absorption vector memory;

calculating an altered image color C'(x,y) by means of altered image calculating means using said absorption quantity, said second absorption vector and said source color density vector, stored in said intermediate image memory, said second absorption vector memory and said source color memory, respectively, by the following equation:

$$C^1(x, y) = 1(x, y) \cdot P^1 + C_s$$

replacing said colored region portion of said data of said overall visual image stored in said color image memory with data representing said altered image color C'(x,y) so as to represent a changed overall visual image;

displaying said changed overall visual image data stored in said color image memory on said display, said given color region being displayed in said second displayed color.

4. An apparatus for recoloring a given colored region in a visual image to be displayed on a display comprising:

means for receiving visual image signals representing said visual image;

a color image memory receiving said visual image signals and storing first data representing said visual image, said color image memory including particular memory locations storing data for said given colored region;

indication means for indicating said given color region in said visual image;

a mask indicating a position of said given colored region in said visual image;

means for calculating an object density vector $C_i(x,y)$ of each data point in said given colored region indicated by said mask;

color distribution calculating means for calculating a directional vector v of a main axis by preparing a covariance matrix based on said object density vector $C_i(x,y)$ and by diagonalizing said covariance matrix;

a main axis vector memory coupled to said color distribution calculating means, said main axis vector memory storing said directional vector;

a pointing device selecting a first data point of said visual image other than a data point of said given colored region to obtain a source color density vector $C_s$;

a source color memory coupled to said pointing device, said source color memory storing said source color density vector;

said pointing device also selecting a second data point, different from said first data point, of said visual image other than a data point of said given colored region to obtain a first reference density vector $C_o$;

a first reference color memory coupled to said pointing device, said first reference color memory storing said first reference density vector;

absorption vector calculating means coupled to receive said source color density vector, said first reference density vector and said directional vector, from said source color memory, said first reference color memory and said main axis vector memory, respectively, for calculating a first absorption vector P by the following equation:

$$P = ((C_o - C_s) \cdot v)v$$

a first absorption vector memory coupled to said absorption vector calculating means, said first absorption vector memory storing said first absorption vector P;

intermediate image calculating means coupled to receive said source color density vector and said first absorption vector, from said source color memory and said first absorption vector memory, respectively, and further using said object density vector, for calculating an absorption quantity l(x,y) by the following equation:

$$l(x, y) = \frac{((C_i(x, y) - C_s) \cdot P)}{(P \cdot P)}$$

an intermediate image memory coupled to said intermediate image calculating means, said intermediate image memory storing said absorption quantity l(x,y);

a second reference color memory storing a second reference density vector $C_o'$;

said absorption vector calculating means further being coupled to receive said source color density vector and said second reference density vector from said source color memory and said second reference color memory, respectively, for calculating a second absorption vector P' by the following equation:

$$P^1 = C_o^1 - C_s$$

a second absorption memory coupled to said absorption vector calculating means, said second absorption memory storing said second absorption vector;

altered image calculating means coupled to receive said absorption quantity, said second absorption vector and said source color density vector, from said intermediate image memory, said second absorption vector memory and said source color memory, respectively, for calculating an altered image color C'(x,y) by the following equation:

$$C^1(x, y) = 1(x, y) \cdot P^1 + C_s$$

said color image memory further being coupled to said altered image calculating means, said color image memory storing said altered image color C'(x,y) in said particular memory locations to form a newly colored visual image having a new color in said given colored region; and said display being coupled to said color image memory and displaying said newly colored visual image.

* * * * *